(12) United States Patent
Sakakibara et al.

(10) Patent No.: US 10,539,890 B2
(45) Date of Patent: Jan. 21, 2020

(54) LIQUID SILICONE RUBBER MIXTURE, AND PRESSURIZING MEMBER OF A FIXING DEVICE FOR AN ELECTROPHOTOGRAPHIC IMAGE FORMING APPARATUS

(71) Applicant: CANON KABUSHIKI KAISHA, Tokyo (JP)

(72) Inventors: Hiroyuki Sakakibara, Yokohama (JP); Katsuhisa Matsunaka, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/958,121

(22) Filed: Apr. 20, 2018

(65) Prior Publication Data

US 2018/0314172 A1 Nov. 1, 2018

(30) Foreign Application Priority Data

Apr. 28, 2017 (JP) ................. 2017-089263

(51) Int. Cl.
*G03G 15/20* (2006.01)
*G03G 5/07* (2006.01)
(Continued)

(52) U.S. Cl.
CPC ............. *G03G 5/078* (2013.01); *C08L 67/00* (2013.01); *C08L 83/04* (2013.01); *C08L 83/10* (2013.01);
(Continued)

(58) Field of Classification Search
CPC .. G03G 5/078; G03G 15/206; G03G 15/0233; G03G 15/0928; G03G 15/162;
(Continued)

(56) References Cited

U.S. PATENT DOCUMENTS 5,148,226 A 9/1992 Setoriyama et al.
5,210,579 A 5/1993 Setoriyama et al.
(Continued)

FOREIGN PATENT DOCUMENTS

JP 4-44075 A 2/1992
JP 4-44076 A 2/1992
(Continued)

OTHER PUBLICATIONS

Abe et al., U.S. Appl. No. 15/877,763, filed Jan. 23, 2018.
Abe et al., U.S. Appl. No. 15/877,777, filed Jan. 23, 2018.

*Primary Examiner* — David M. Gray
*Assistant Examiner* — Laura Roth
(74) *Attorney, Agent, or Firm* — Venable LLP (57) ABSTRACT

A liquid silicone rubber mixture, includes an organopolysiloxane having two or more unsaturated aliphatic groups in a molecule thereof; an organohydrogenpolysiloxane having two or more hydrogen atoms bonded to a silicon atom in a molecule thereof; a hydrosilylation catalyst; hollow particles each having a layer containing a thermoplastic resin as a shell; a compound having a hydroxyl group and/or an ether bond in its molecule so that a sum of a number of the hydroxyl group and a number of the ether bond is two or more; and a polycarboxylic acid. A pressurizing member of a fixing device for use in an electrophotographic image forming apparatus includes an elastic layer containing a silicone rubber on a substrate.

5 Claims, 4 Drawing Sheets

(51) Int. Cl.
*C08L 67/00* (2006.01)
*C08L 83/10* (2006.01)
*C08L 83/04* (2006.01)
*C08G 77/12* (2006.01)
*C08G 77/20* (2006.01)

(52) U.S. Cl.
CPC ........... *G03G 15/206* (2013.01); *C08G 77/12* (2013.01); *C08G 77/20* (2013.01); *G03G 15/2057* (2013.01); *G03G 2215/2051* (2013.01)

(58) Field of Classification Search
CPC ........... G03G 15/1685; G03G 15/2057; G03G 2215/00957; G03G 2215/0861; G03G 2215/2051; C08L 67/00; C08L 83/10
See application file for complete search history.

(56) References Cited

U.S. PATENT DOCUMENTS

| | | | |
|---|---|---|---|
| 5,525,775 | A | 6/1996 | Setoriyama et al. |
| 5,822,671 | A * | 10/1998 | Takama ............... G03G 8/00 399/342 |
| 6,110,642 | A * | 8/2000 | Naruse ............... G03F 7/115 430/162 |
| 6,459,878 | B1 | 10/2002 | Tomoyuki et al. |
| 6,546,223 | B2 | 4/2003 | Kishino et al. |
| 7,734,241 | B2 | 6/2010 | Nishida et al. |
| 8,626,046 | B2 | 1/2014 | Sekihara et al. |
| 8,913,937 | B2 | 12/2014 | Sakakibara |
| 9,063,491 | B2 | 6/2015 | Matsunaka et al. |
| 9,086,664 | B2 | 7/2015 | Matsunaka et al. |
| 9,134,663 | B2 | 9/2015 | Matsunaka et al. |
| 9,134,664 | B2 | 9/2015 | Miura et al. |
| 9,164,450 | B2 | 10/2015 | Matsumoto et al. |
| 9,268,273 | B2 | 2/2016 | Miyahara et al. |
| 9,315,703 | B2 | 4/2016 | Matsunaka et al. |
| 9,348,281 | B2 | 5/2016 | Abe et al. |
| 9,354,571 | B2 | 5/2016 | Miura et al. |
| 9,367,008 | B2 | 6/2016 | Sakakibara et al. |
| 9,367,009 | B2 | 6/2016 | Akiyama et al. |
| 9,395,666 | B2 | 7/2016 | Abe et al. |
| 9,465,338 | B2 | 10/2016 | Maeda et al. |
| 9,671,731 | B2 | 6/2017 | Matsunaka et al. |
| 9,891,565 | B1 | 2/2018 | Miyahara et al. |
| 2008/0080913 | A1 * | 4/2008 | Van Bortel ........ G03G 15/6573 399/341 |
| 2009/0017394 | A1 * | 1/2009 | Pang ................... G03G 9/0806 430/109.31 |
| 2014/0356040 | A1 * | 12/2014 | Sakakibara ........ G03G 15/2057 399/333 |
| 2015/0125195 | A1 * | 5/2015 | Nishida ................. B05D 3/007 399/333 |

FOREIGN PATENT DOCUMENTS

| | | |
|---|---|---|
| JP | 4-44077 A | 2/1992 |
| JP | 4-44078 A | 2/1992 |
| JP | 4-44079 A | 2/1992 |
| JP | 4-44080 A | 2/1992 |
| JP | 4-44081 A | 2/1992 |
| JP | 4-44082 A | 2/1992 |
| JP | 4-44083 A | 2/1992 |
| JP | 4-204980 A | 7/1992 |
| JP | 4-204981 A | 7/1992 |
| JP | 4-204982 A | 7/1992 |
| JP | 4-204983 A | 7/1992 |
| JP | 4-204984 A | 7/1992 |
| JP | 2001-62380 A | 3/2001 |
| JP | 2002-70838 A | 3/2002 |
| JP | 2002-213432 A | 7/2002 |
| JP | 2003-226774 A | 8/2003 |
| JP | 2012-251041 A | 12/2012 |

* cited by examiner

LIQUID SILICONE RUBBER MIXTURE, AND PRESSURIZING MEMBER OF A FIXING DEVICE FOR AN ELECTROPHOTOGRAPHIC IMAGE FORMING APPARATUS

BACKGROUND OF THE INVENTION

Field of the Invention

The present disclosure relates to a fixing device of an electrophotographic image forming apparatus, such as an electrophotographic copying machine or an electrophotographic printer, an electrophotographic member to be used in, for example, a fixing member of the fixing device, and a liquid silicone rubber mixture to be used in production of the electrophotographic member.

Description of the Related Art

In an electrophotographic image forming apparatus, for example, the following fixing units (I) and (II) have been known as on-demand type heating and fixing units:
(I) a fixing unit including a ceramic heater serving as a heating body arranged in a film-shaped rotating body and a pressurizing roller configured to form a nip portion with the ceramic heater through the film-shaped rotating body, the fixing unit being configured to heat an unfixed toner image on a recording material with the rotating body heated by the ceramic heater in the nip portion; and
(II) a fixing unit including a film-shaped or roller-shaped rotating body, a unit for causing the rotating body itself to generate heat through electromagnetic induction, and a pressurizing roller configured to form a nip portion with the rotating body, the fixing unit being configured to heat an unfixed toner image on a recording material with the rotating body generating heat in the nip portion.

In recent years, with growing demands for a faster first print output time and energy savings, a fixing device having a short heat rising time and a low electric power consumption has been desired. In such fixing device, a pressurizing roller having a high heat insulating property has been required. That is, when the heat conductivity of the elastic layer of the pressurizing roller is reduced, the quantity of heat drawn by the pressurizing roller at the time of the start of the operation of the fixing device is suppressed, and hence a time period required for the temperature of a nip portion to increase up to a temperature needed for fixation can be shortened.

In Japanese Patent Application Laid-Open No. 2002-70838, as a roller that can be used in the pressurizing roller of a fixing device, there is a disclosure of a roller whose elastic layer is formed by curing a silicone rubber blended with resin microballoons that have already been expanded, the roller having such gas permeability as to show the following recovery. When the roller is left to stand in a vacuum chamber in which a pressure reduces from an atmospheric pressure to reach 0.001 MPa or less within 2 minutes, the amount of an increase in thickness of the elastic layer 10 minutes after the start of the pressure reduction is $2/3$ or less of the maximum value of the amount of the increase in thickness of the elastic layer during 10 minutes from the start of the pressure reduction.

In Japanese Patent Application Laid-Open No. 2002-70838, there is a description that the elastic layer of the roller is formed as described below. In a process for the formation of the elastic layer, the plurality of resin microballoons that have already been expanded in the silicone rubber used in the formation of the elastic layer are broken, and a plurality of voids formed by the breakage are coupled to each other by the vaporization of a vaporization component, such as ethylene glycol, blended into the silicone rubber to form the layer.

Here, the inventors have found that in order that an elastic layer having a communication hole that is obtained by coupling the plurality of voids derived from the resin microballoons to each other and that communicates to the outside may be obtained, the following two actions are needed in a production process therefor:
(A) at the time of the curing of a liquid silicone rubber mixture, the resin microballoons are agglomerated; and
(B) after the curing of the liquid silicone rubber mixture, the shells of the resin microballoons are peeled from the cured silicone rubber.

With regard to the (B), when, at the time of the production of the elastic layer, in the voids derived from the resin microballoons in the cured silicone rubber, the shells of the resin microballoons are not sufficiently peeled from a wall surface formed of the cured silicone rubber, the peeling of the shells from the wall surface is advanced by using a pressurizing roller in some cases. As a result, as the pressurizing roller is used, the hardness of the pressurizing roller changes and the quality of an electrophotographic image also changes in accordance with the change in some cases.

In addition, according to an investigation by the inventors, it has been assumed that the vaporization component, such as ethylene glycol, used in the formation of the roller according to Japanese Patent Application Laid-Open No. 2002-70838 not only couples the voids derived from the resin microballoons but also causes the actions (A) and (B).

However, as a result of a further investigation by the inventors, it has been found that even in the elastic layer formed by using the liquid silicone rubber mixture containing the vaporization component, the action (A) or (B) is not sufficiently exhibited, and hence, for example, the hardness of the pressurizing roller reduces in association with its use in some cases.

SUMMARY OF THE INVENTION

One embodiment of the present disclosure is directed to providing a liquid silicone rubber mixture providing an electrophotographic member that includes an elastic layer having a communication hole communicating to the outside and that shows a small change in hardness even after a long-term use.

Another embodiment of the present disclosure is directed to providing an electrophotographic member that includes an elastic layer having a communication hole communicating to the outside and that shows a small change in hardness even after a long-term use, and a process of producing the electrophotographic member.

According to one embodiment of the present disclosure, there is provided a liquid silicone rubber mixture, including following components (1) to (6):
(1) an organopolysiloxane having two or more unsaturated aliphatic groups in a molecule thereof;
(2) an organohydrogenpolysiloxane having two or more hydrogen atoms bonded to a silicon atom in a molecule thereof;
(3) a hydrosilylation catalyst;
(4) hollow particles each having a layer containing a thermoplastic resin as a shell;

(5) a compound having at least one selected from the group consisting of a hydroxyl group and an ether bond in a molecule thereof, and having a sum of a number of the hydroxyl group and a number of the ether bond of two or more; and (6) a polycarboxylic acid.

According to another embodiment of the present disclosure, there is provided a liquid silicone rubber mixture, including following components (1) to (3), (6), and (7):

(1) an organopolysiloxane having two or more unsaturated aliphatic groups in a molecule thereof;

(2) an organohydrogenpolysiloxane having two or more hydrogen atoms bonded to a silicon atom in a molecule thereof;

(3) a hydrosilylation catalyst;

(6) a polycarboxylic acid; and (7) an agglomerate of a plurality of hollow particles each including a shell containing a thermoplastic resin.

According to another embodiment of the present disclosure, there is provided an electrophotographic member, including:

a substrate; and an elastic layer containing a silicone rubber on the substrate, in which the elastic layer has a communication hole that is obtained by coupling a plurality of holes to each other and that communicates to an outside, and further contains a polycarboxylic acid.

According to another embodiment of the present disclosure, there is provided a process of producing an electrophotographic member including a substrate and an elastic layer on the substrate, the elastic layer having a communication hole that is obtained by coupling a plurality of holes to each other and that communicates to an outside, the process including steps of:

(a) forming a layer of a liquid silicone rubber mixture containing following components (1) to (6) on the substrate:
 (1) an organopolysiloxane having two or more unsaturated aliphatic groups in a molecule thereof;
 (2) an organohydrogenpolysiloxane having two or more hydrogen atoms bonded to a silicon atom in a molecule thereof;
 (3) a hydrosilylation catalyst;
 (4) hollow particles each having a layer containing a thermoplastic resin as a shell;
 (5) a compound having at least one selected from the group consisting of a hydroxyl group and an ether bond in a molecule thereof, and having a sum of a number of the hydroxyl group and a number of the ether bond of two or more; and
 (6) a polycarboxylic acid;

(b) first crosslinking the liquid silicone rubber mixture in the layer of the liquid silicone rubber mixture to form a layer containing a cured silicone rubber and an agglomerate of the hollow particles dispersed in the cured silicone rubber;

(c) secondary crosslinking the cured silicone rubber; and (d) causing the hollow particles in the layer containing the cured silicone rubber to undergo foam breakage to couple a plurality of holes derived from the hollow particles to each other to form the communication hole, and peeling the shells of the hollow particles from a wall surface of the cured silicone rubber, to form the elastic layer.

According to still another embodiment of the present disclosure, there is provided a fixing device, including the electrophotographic member as a pressurizing member.

Further features of the present disclosure will become apparent from the following description of exemplary embodiments with reference to the attached drawings.

DESCRIPTION OF THE EMBODIMENTS

Preferred embodiments of the present disclosure will now be described in detail in accordance with the accompanying drawings.

The inventors have made an investigation on the reason why even in the elastic layer formed by using the liquid silicone rubber mixture containing a specific vaporization component according to Japanese Patent Application Laid-Open No. 2002-70838, the action (B) is not sufficiently exhibited, and hence the hardness of the elastic layer reduces in association with its use in some cases.

As a result, it has been found that the vaporization component causes the action (A) and the action (B) at the same time, and hence cannot control the respective actions independently, and as a result, when the amount of the vaporization component needed for moderate agglomeration of the resin microballoons and the amount of the vaporization component needed for sufficient peeling of the shells of the resin microballoons from the wall surface of the cured silicone rubber are different from each other, one of the action (A) and the action (B) becomes insufficient.

In view of the foregoing, the inventors have made a further investigation for obtaining a liquid silicone rubber mixture that can control the action (A) and the action (B) independently. As a result, the inventors have found that a polycarboxylic acid can effectively exhibit an action of peeling the shells of the resin microballoons from the wall surface of the cured silicone rubber.

[Liquid Silicone Rubber Mixture]

A liquid silicone rubber mixture according to one embodiment of the present disclosure includes following components (1) to (6):

(1) an organopolysiloxane having two or more unsaturated aliphatic groups in a molecule thereof;

(2) an organohydrogenpolysiloxane having two or more hydrogen atoms bonded to a silicon atom in a molecule thereof;

(3) a hydrosilylation catalyst;

(4) hollow particles each having a layer containing a thermoplastic resin as a shell;

(5) a compound having at least one selected from the group consisting of a hydroxyl group and an ether bond in a molecule thereof, and having a sum of a number of the hydroxyl group and a number of the ether bond of two or more; and (6) a polycarboxylic acid.

In the present disclosure, the term "an ether bond" means "—C—O—C—" bond.

Although it has still been unable to sufficiently elucidate actions and effects exhibited by the components (5) and (6) at the time of the formation of an elastic layer through the curing treatment of the liquid silicone rubber mixture, the inventors have assumed the actions and effects to be as described below.

The compound corresponding to the component (5) has satisfactory affinities for the surfaces of the hollow particles (hereinafter also referred to as "resin microballoons") corresponding to the component (4). However, the compound has poor affinities for base rubber materials corresponding to the components (1) to (3), and hence the compound is not compatible with the materials but is in a state of being separated therefrom. Probably because of the characteristic, such compound serves as an agglomerating agent for controlling the state of agglomeration of the resin microballoons in the liquid silicone rubber mixture. That is, the state of agglomeration of the resin microballoons, that is, the form of a communication hole after the curing of the silicone rubber can be controlled by blending the compound corresponding to the component (5) into the liquid silicone rubber mixture containing the resin microballoons.

In addition, the whole or part of the polycarboxylic acid corresponding to the component (6) according to the present disclosure may be present while being dissolved in the compound corresponding to the component (5) in the liquid silicone rubber mixture. After that, at a stage where the liquid silicone rubber mixture is cured by heating to be secondary crosslinked, the compound corresponding to the component (5) wholly or partially vaporizes. Meanwhile, the polycarboxylic acid has a high boiling point, and hence does not volatilize but remains between each of the shells of the resin microballoons and the wall surface of the cured silicone rubber.

In this state, when a temperature environment higher than the softening point of each of the shells of the resin microballoons is established, and hence the resin microballoons undergo foam breakage to cause shrinkage, the shells may effectively peel from the wall surface of the cured silicone rubber to form the communication hole in the silicone rubber. Therefore, the communication hole in the silicone rubber is a communication hole obtained by coupling a plurality of holes derived from the hollow particles (resin microballoons) to each other. In addition, part of the communication hole communicates to the outside. The materials forming the liquid silicone rubber mixture are sequentially described below.

[Components (1) to (3): Base Rubber Materials]

The materials corresponding to the component (1), the component (2), and the component (3) are components serving as base rubber materials for the elastic layer of an electrophotographic member. In a fixing device, the elastic layer of a pressurizing member functions as a layer configured to cause the pressurizing member to carry such elasticity that the member can form a fixing nip by being brought into pressure contact with an opposing member. In order to express such function, a silicone rubber is preferably used as a base rubber material for the elastic layer from the viewpoint of the heat resistance of the layer. Of such rubbers, an addition-curing type silicone rubber is preferred. This is because of the following reason: many addition-curing type silicone rubbers are in liquid states at stages before curing, and hence the hollow particles, the agglomerating agent for the hollow particles, and the polycarboxylic acid can be easily dispersed in any such rubber, and the elasticity of the elastic layer can be adjusted by adjusting the degree of crosslinking of the rubber.

The addition-curing type silicone rubber generally contains an organopolysiloxane having an unsaturated aliphatic group, an organohydrogenpolysiloxane having a hydrogen atom bonded to a silicon atom, and a platinum compound serving as a hydrosilylation catalyst.

In the liquid silicone rubber mixture, examples of the hydrosilylation catalyst corresponding to the component (3) include hydrogen hexachloroplatinate(IV) hexahydrate, a divinyltetramethylsiloxane-platinum complex, a cyclovinylmethylsiloxane-platinum complex, and a carbonyl-cyclovinylmethylsiloxane-platinum complex.

In the liquid silicone rubber mixture, examples of the organopolysiloxane corresponding to the component (1) include the following:

a linear organopolysiloxane in which each of both terminals of its molecule is represented by $R^1_2R^2SiO_{1/2}$ and its intermediate units are represented by $R^1_2SiO$ and $R^1R^2SiO$; and a branched polyorganosiloxane in which its intermediate unit includes $R^1SiO_{3/2}$ or $SiO_{4/2}$.

In this case, $R^1$ represents a monovalent unsubstituted or substituted hydrocarbon group containing no unsaturated aliphatic group and bonded to a silicon atom. Specific examples of $R^1$ include:

an alkyl group (e.g., a methyl group, an ethyl group, a propyl group, a butyl group, a pentyl group, or a hexyl group);

an aryl group (e.g., a phenyl group); and a substituted hydrocarbon group (e.g., a chloromethyl group, a 3-chloropropyl group, a 3,3,3-trifluoropropyl group, a 3-cyanopropyl group, or a 3-methoxypropyl group).

In particular, from the viewpoints that synthesis and handling are easy and excellent heat resistance is obtained, it is preferred that 50% or more of $R^1$'s represent methyl groups, and it is particularly preferred that all $R^1$'s represent methyl groups.

In addition, $R^2$ represents an unsaturated aliphatic group bonded to a silicon atom. Examples thereof include a vinyl group, an allyl group, a 3-butenyl group, a 4-pentenyl group, and a 5-hexenyl group. From the viewpoints that synthesis and handling are easy and a crosslinking reaction is easily performed, a vinyl group is preferred as $R^2$.

In order to advance a curing reaction, the organopolysiloxane corresponding to the component (1) needs to have two or more unsaturated aliphatic groups each represented by $R^2$ in a molecule thereof.

The amount of the unsaturated aliphatic groups in the organopolysiloxane corresponding to the component (1) is preferably 0.1 mol % or more and 2.0 mol % or less, particularly preferably 0.2 mol % or more and 1.0 mol % or less with respect to 1 mol of a silicon atom.

The kinematic viscosity of the organopolysiloxane corresponding to the component (1) at 25° C. falls within the range of preferably 10 mm$^2$/s or more and 100,000 mm$^2$/s or less, more preferably 100 mm$^2$/s or more and 10,000 mm$^2$/s or less.

When the kinematic viscosity falls within the range of 10 mm$^2$/s or more and 100,000 mm$^2$/s or less, it becomes easier to mix and disperse the resin microballoons.

In the liquid silicone rubber mixture, the organohydrogenpolysiloxane corresponding to the component (2) is a crosslinking agent for forming a crosslinked structure through a reaction with an unsaturated aliphatic group of the organopolysiloxane component corresponding to the component (1), such as an alkenyl group, with the aid of the catalytic action of the hydrosilylation catalyst corresponding to the component (3). The number of hydrogen atoms bonded to a silicone atom in the organohydrogenpolysiloxane needs to be two or more in a molecule thereof, and is preferably three or more.

An organic group bonded to a silicon atom in the organohydrogenpolysiloxane is, for example, the same unsubstituted or substituted monovalent hydrocarbon group as that represented by $R^1$ of the organopolysiloxane component having an unsaturated aliphatic group. The organic group is particularly preferably a methyl group because the methyl group is easy to synthesize and handle.

The kinematic viscosity of the organohydrogenpolysiloxane at 25° C. falls within the range of preferably 5 $mm^2/s$ or more and 100,000 $mm^2/s$ or less, more preferably 10 $mm^2/s$ or more and 100 $mm^2/s$ or less. When the kinematic viscosity falls within the range, there is no risk in that the organohydrogenpolysiloxane volatilizes during its storage to preclude the obtainment of a desired degree of crosslinking and desired physical properties of a molded article. In addition, the organohydrogenpolysiloxane becomes easier to synthesize and handle, and can be uniformly dispersed in the liquid silicone rubber mixture with ease.

Any one of linear, branched, and cyclic siloxane skeletons may be used as the siloxane skeleton, and a mixture thereof may be used. In particular, a linear siloxane skeleton is preferred because the linear siloxane skeleton is easy to synthesize. Si—H bonds may be present in any siloxane units in the molecule. It is preferred that at least part thereof be present in a siloxane unit at a molecular terminal, such as an $R^1{}_2HSiO_{1/2}$ unit.

The liquid silicone rubber mixture may be blended with, for example, a curing retarder for the purpose of controlling its reactivity, and may be blended with various fillers for the purpose of securing heat resistance, electrical conductivity, a reinforcing property, moldability, or the like.

[Component (4): Hollow Particles]

Examples of the hollow particles each having the layer containing the thermoplastic resin as the shell include resin microballoons. Examples of the resin microballoons include acrylonitrile resin microballoons, vinylidene chloride resin microballoons, and phenol resin microballoons.

Of those, acrylonitrile resin microballoons are preferred from the viewpoint of dispersibility in the liquid silicone rubber mixture. The resin microballoons each have such a structure that a gas, such as a hydrocarbon, is sealed in the shell formed of the thermoplastic resin, and resin microballoons in unexpanded states and resin microballoons in already expanded states have been put on the market. When the resin microballoons are used by being dispersed in the base rubber material, the resin microballoons in already expanded states are preferably used from the viewpoint of dimensional stability at the time of the molding of the elastic layer.

Description is given below by taking the resin microballoons as an example of the hollow particles, but the hollow particles are not limited to the resin microballoons.

The softening decomposition temperature of each of the resin microballoons may be appropriately selected in accordance with the kind of base rubber material to be used. When an addition-curing type silicone rubber is used as a base rubber material for the elastic layer, resin microballoons that stably exist without undergoing foam breakage up to a temperature of about 100° C. or more serving as a first crosslinking temperature, and that undergo softening and decomposition, and foam breakage at a temperature around 200° C. serving as a secondary crosslinking temperature are preferred. The addition-curing type silicone rubber is hereinafter sometimes referred to as "liquid silicone rubber."

The average particle diameter of the resin microballoons is preferably 200 μm or less, more preferably 150 μm or less. When the average particle diameter is 200 μm or less, there is no concern that the resin microballoons are broken before the curing of the rubber by a pressure at the time of molding to be described later.

Meanwhile, the average particle diameter is preferably 10 μm or more. When the average particle diameter is 10 μm or more, an excessively large number of resin microballoons are not needed for securing a moderate void ratio in the elastic layer. As a result, an increase in usage amount of the agglomerating agent for the hollow particles proportional to a surface area occupied by the resin microballoons in the elastic layer after first crosslinking can be suppressed. The average particle diameter is a volume-average particle diameter measured with a laser diffraction/scattering particle size distribution-measuring apparatus (product name: MICROTRAC MT3300II; manufactured by MicrotracBEL Corporation) by a dry measurement method.

The blending amount of the resin microballoons is preferably 10 vol % or more and 60 vol % or less with respect to the whole of the liquid silicone rubber mixture. When the amount is 10 vol % or more, the heat insulating performance of the elastic layer can be secured. In addition, when the amount is 60 vol % or less, a void ratio after the molding of the elastic layer does not become excessively high, and hence a reduction in blending amount of the silicone rubber component can be relatively suppressed and a reduction in strength of the elastic layer can be suppressed.

[Component (5): Agglomerating Agent for Hollow Particles]

Figure 2:
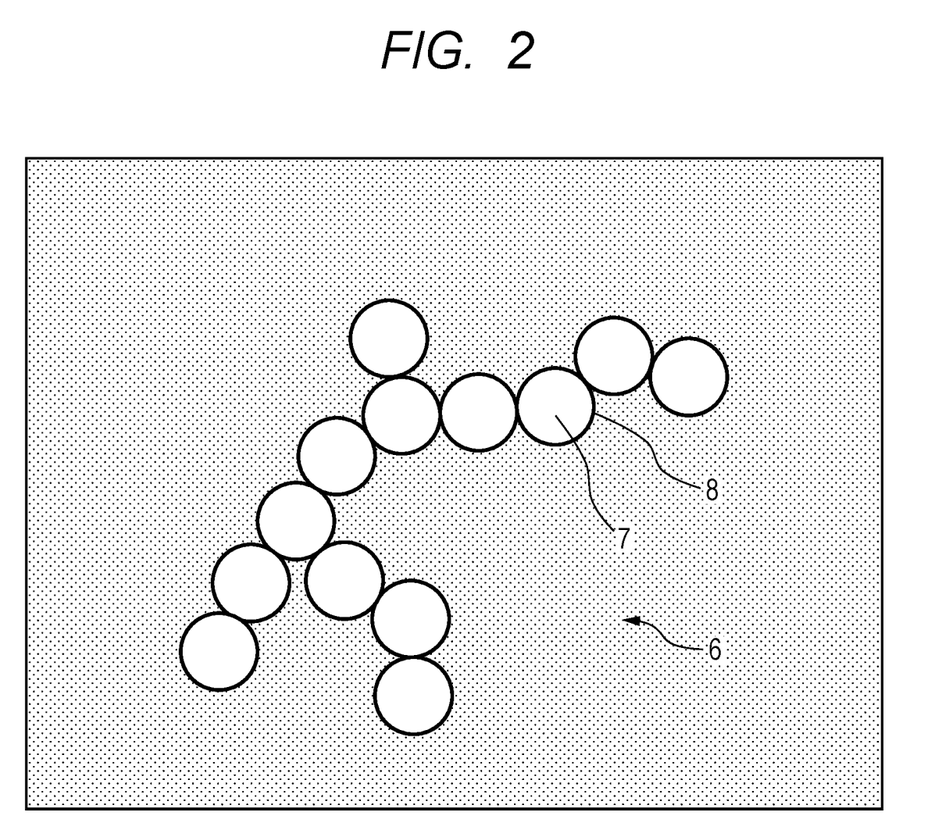
FIG. 2 is a schematic model view for illustrating the state of presence of hollow particles in a base rubber material in a process for the formation of the elastic layer of an electrophotographic member according to the present disclosure.

The compound corresponding to the component (5) serves as an agglomerating agent for the hollow particles (hereinafter sometimes simply referred to as "agglomerating agent") for agglomerating the hollow particles. That is, it is important that the agglomerating agent be a substance having satisfactory affinities for the resin microballoons and having a poor affinity for the liquid silicone rubber serving as a base rubber material. Thus, the agglomerating agent is dispersed in the liquid silicone rubber in a state of adhering to the surfaces of the resin microballoons, and hence an action of connecting the resin microballoons together is expressed. As a result, the resin microballoons connected in a row are dispersed and arranged in the liquid silicone rubber. Accordingly, as illustrated in FIG. 2, even at the time of the first crosslinking of the liquid silicone rubber mixture, the rubber is cured while a form in which the resin microballoons are connected in a row is maintained. In addition, the agglomerating agent needs to be capable of dissolving the polycarboxylic acid serving as a peeling agent to be described later.

The agglomerating agent for the hollow particles to be used here is one or more compounds selected from the following group from the viewpoints of affinities for the resin microballoons and the solubility of the polycarboxylic acid: compounds each having at least one selected from the group consisting of a hydroxyl group and an ether bond in a molecule thereof, and each having a sum of the number of hydroxyl groups and the number of ether bonds of two or more.

In the compound corresponding to the component (5), a compound having two or more hydroxyl groups is referred to as "polyhydric alcohol," a compound having both a hydroxyl group and an ether bond is referred to as "partially etherified compound," and a compound having two or more ether bonds and free of any hydroxyl group is referred to as "wholly etherified compound." In the case where the polyhydric alcohol and the partially etherified compound are used, a hydroxyl group (referred to as "alcoholic hydroxyl group") is present, and hence the compounds have a function of peeling the resin microballoons from the cured silicone rubber in addition to a function of agglomerating the resin microballoons. In this case, an insufficient peeling function is compensated by the polycarboxylic acid.

Meanwhile, no alcoholic hydroxyl group is present in the wholly etherified compound, and hence the compound has a function of agglomerating the resin microballoons but does not have a function of peeling the resin microballoons. Accordingly, the wholly etherified compound can be caused to exhibit the agglomerating function and the polycarboxylic acid can be caused to exhibit the peeling function, and hence the respective functions can be independently controlled. Therefore, the wholly etherified compound is preferably used as the agglomerating agent for the hollow particles.

A glycol diether is preferably used as the wholly etherified compound. The glycol diether is also referred to as "glyme" or the like, and has been known as an aprotic solvent obtained by substituting hydrogen of a terminal hydroxyl group of a glycol ether with an alkyl group. In addition, the glycol diether has two or more oxygen atoms in a molecule thereof, and hence can easily have a coordination structure and is excellent in solubility of a substance having high polarity, such as the polycarboxylic acid.

In addition, the wholly etherified compound is preferably a methyl ether, and specific examples thereof include the following substances (their abbreviated names are shown in parentheses), and the substances are also commercially available: tetraethylene glycol dimethyl ether (MTEM), triethylene glycol dimethyl ether (MTM), diethylene glycol dimethyl ether (MDM), and tripropylene glycol dimethyl ether (MTPOM).

In addition, partially methyl-etherified compounds, such as diethylene glycol ethyl methyl ether (EDM), diethylene glycol butyl methyl ether (BDM), and triethylene glycol butyl methyl ether (BTM), may be used.

Examples of the polyhydric alcohol include: glycols serving as dihydric alcohols, such as ethylene glycol (EG), diethylene glycol (DEG), triethylene glycol (TEG), tetraethylene glycol (TEEG), and dipropylene glycol (DPG); and alcohols that are trihydric or more, such as glycerin.

Examples of the partially etherified compound include glycol ethers, such as ethylene glycol monomethyl ether (MC), diethylene glycol monomethyl ether (DM), triethylene glycol monomethyl ether (TM), and dipropylene glycol monomethyl ether (DPM).

The boiling point of the compound corresponding to the component (5) is preferably a temperature equal to or more than the first crosslinking temperature of the liquid silicone rubber mixture, and is more preferably 160° C. or more.

An agglomerating agent having a boiling point of 160° C. or more is, for example, MTEM, MTM, MDM, MTPOM, EDM, BDM, BTM, EG, DEG, TEG, TEEG, DPG, DM, TM, or DPM.

When the boiling point of the compound corresponding to the component (5) is a temperature equal to or more than the secondary crosslinking temperature of the silicone rubber, the compound remains in the elastic layer.

The component (5) is preferably at least one selected from the group consisting of triethylene glycol dimethyl ether (MTM), tetraethylene glycol dimethyl ether (MTEM), and diethylene glycol dimethyl ether (MDM).

The content of the component (5) in 100 parts by mass of the liquid silicone rubber mixture is preferably from 1 part by mass to 10 parts by mass, though the preferred value depends on the content of the hollow particles. When the content is 1 part by mass or more, an agglomerating effect on the hollow particles is not impaired. In addition, when the content is 10 parts by mass or less, the agglomeration of the hollow particles does not excessively occur, and hence the separation of the hollow particles in the silicone rubber can be suppressed. The compounds corresponding to the component (5) may be used alone or in combination thereof.

[Component (6): Polycarboxylic Acid]

The polycarboxylic acid is a substance having two or more carboxylic acid groups in a molecule thereof, and may also have a functional group except a carboxylic acid group. In the liquid silicone rubber mixture, the polycarboxylic acid is present around the resin microballoons in a state of being dissolved in the compound corresponding to the component (5). Accordingly, when the resin microballoons are softened by heating to be shrunk and broken after the curing of the silicone rubber, the polycarboxylic acid serves as a peeling agent for peeling the resin microballoons from the wall surface of the silicone rubber.

The mechanism via which the component (6) functions as a peeling agent is considered to be as described below. The polycarboxylic acid is present between the outer surface of each of the shells of the resin microballoons and the wall surface of the silicone rubber to suppress the adhesion of the silicone rubber and the resin microballoons, thereby exhibiting a peeling action.

Specific examples of the polycarboxylic acid include the following substances: citric acid, malic acid, tartaric acid, succinic acid, phthalic acid, malonic acid, oxalic acid, terephthalic acid, and aconitic acid.

Of those, at least one selected from the group consisting of citric acid, malic acid, tartaric acid, succinic acid, and o-phthalic acid is preferably used.

The content of the polycarboxylic acid (component (6)) in 100 parts by mass of the liquid silicone rubber mixture is preferably from 0.5 part by mass to 5.0 parts by mass, though the preferred value depends on the content of the hollow particles. The content of the polycarboxylic acid (component (6)) is preferably 0.05 time or more and 2.00 times or less as large as the content (part(s) by mass) of the agglomerating agent (component (5)). When a ratio between the contents of both the components falls within the range, the peeling of the resin microballoons from the wall surface at the time of the heating of the liquid silicone rubber mixture efficiently advances. The polycarboxylic acids corresponding to the component (6) may be used alone or in combination thereof.

From another viewpoint, the liquid silicone rubber mixture includes following components (1) to (3), (6), and (7):

(1) an organopolysiloxane having two or more unsaturated aliphatic groups in a molecule thereof;

(2) an organohydrogenpolysiloxane having two or more hydrogen atoms bonded to a silicon atom in a molecule thereof;

(3) a hydrosilylation catalyst;

(6) a polycarboxylic acid; and (7) an agglomerate of a plurality of hollow particles each including a shell containing a thermoplastic resin.

Here, the components (1) to (3) and (6) are the components (1) to (3) and (6) that have already been described, and the component (7) is an agglomerate obtained by agglomerating the plurality of hollow particles corresponding to the component (4). The liquid silicone rubber mixture is a composition useful as a material for forming the elastic layer or the like. An electrophotographic member according to the present disclosure is, for example, a pressurizing member, a transfer member, or a charging member, and the shape of each of the members is, for example, a roller shape or a plate shape. In addition, the electrophotographic member is particularly useful as a pressurizing member in a fixing device.

[Electrophotographic Member]

The electrophotographic member according to one embodiment of the present disclosure includes a substrate, an elastic layer containing a silicone rubber on the outer circumference thereof, and a surface layer. The elastic layer has a communication hole that is obtained by coupling a plurality of holes to each other and that communicates to the outside, and further contains a polycarboxylic acid. The polycarboxylic acid is the component (6) in the liquid silicone rubber mixture. The electrophotographic member is described below by taking a roller for electrophotography, in particular, the pressurizing roller of a fixing device as an example.

Figure 1:
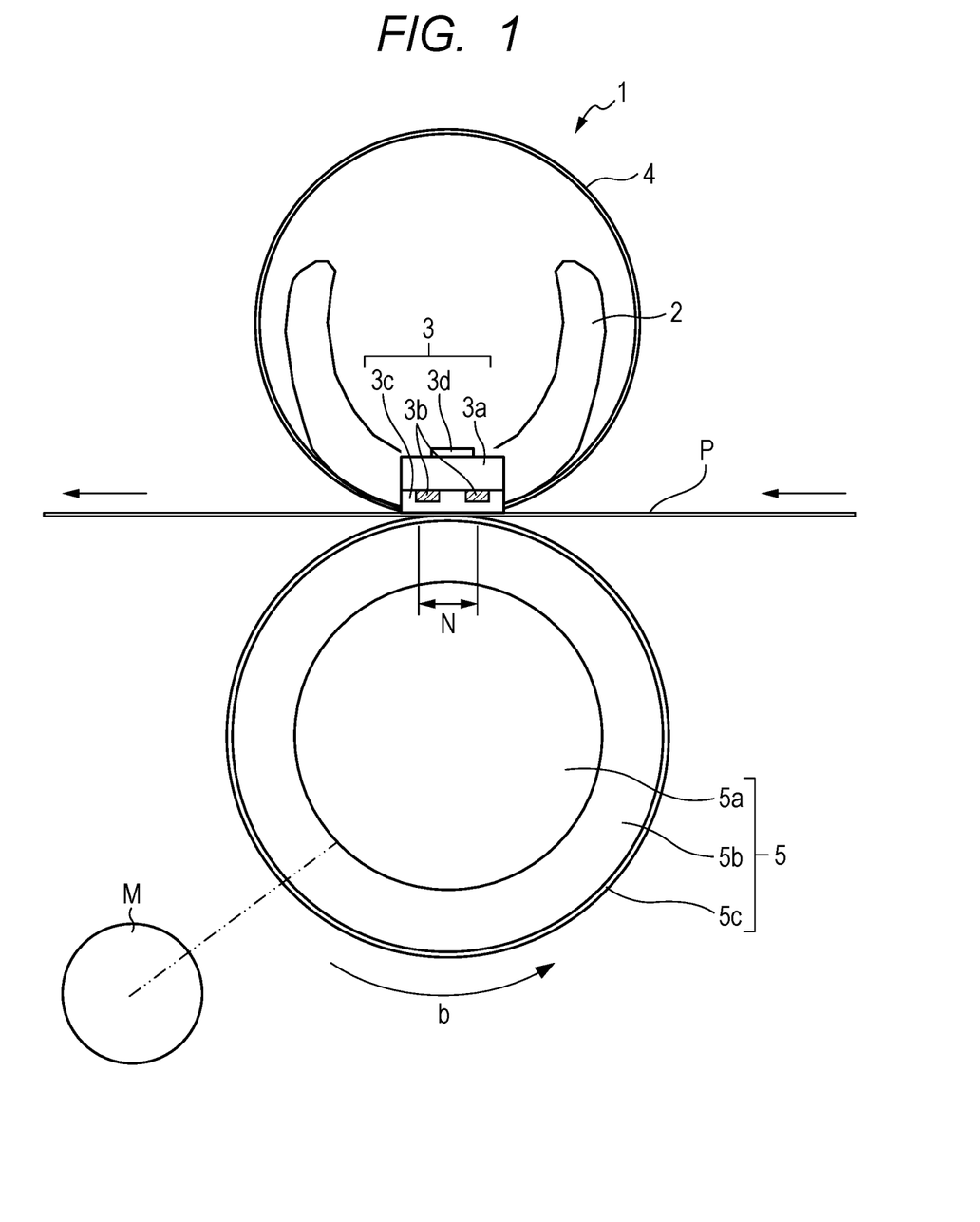
FIG. 1 is a schematic construction model view of an example of a fixing device according to the present disclosure.

A pressurizing roller 5 illustrated in FIG. 1 is a pressurizing roller obtained by laminating a substrate 5a, an elastic layer 5b on the substrate, and a surface layer 5c serving as an outermost layer on the elastic layer.

[Substrate]

A material for the substrate 5a is, for example, a metal, such as aluminum or iron, or an alloy thereof (e.g., stainless steel (SUS)). The inside of the substrate 5a may be hollow or may be solid. When the inside of the substrate 5a is hollow, the substrate only needs to have such strength as to withstand a pressure force at the time of its use. In addition, when the inside of the substrate 5a is hollow, a heat source may be arranged therein. In addition, a layer (not shown) for imparting a function, such as an adhesive property with the elastic layer, may be further arranged on the outer surface of the substrate.

In general, a gear for imparting a rotational driving force or a notch for mounting the gear may be formed in one end portion, or each of both end portions, in the longitudinal direction of the substrate. In addition, a bearing for reducing torque at the time of the rotation of the pressurizing roller may be set as required.

[Elastic Layer]

The elastic layer 5b has a communication hole that is obtained by coupling a plurality of holes to each other and that communicates to the outside. However, not all the plurality of holes coupled to each other are required to communicate with the outside. The term "outside" as used herein means a peripheral outside surrounding the electrophotographic member including the elastic layer 5b. For example, even when the surface layer 5c covers the circumferential surface of the elastic layer 5b, it is sufficient that a side surface of the elastic layer 5b be exposed to the outside and the communication hole communicates to the outside in the exposed portion. The ratio of the communication hole in the elastic layer may be represented as a water absorption ratio, and the water absorption ratio of the elastic layer 5b in water and under reduced pressure is preferably 70% or more.

That is, a water absorption amount per 1 g of the elastic layer 5b in water and under reduced pressure is 0.70 g or more. The water absorption amount may be determined by sinking a sample piece of the elastic layer 5b in water to bring the periphery thereof into a reduced pressure state, and substituting air present in the communication hole communicating to up to the surface of the sample piece with the water. As the number of holes coupled to each other increases, the water absorption ratio of the communication hole increases. A specific measurement method is described later. An upper limit for the water absorption ratio is preferably 150% or less, more preferably 110% or less. The upper limit value is determined in consideration of, for example, the strength of the elastic layer 5b.

The elastic layer 5b having such communication hole may be formed, for example, as described below. First, a liquid silicone rubber in an uncrosslinked state is used as a base rubber material, and resin microballoons serving as hollow particles, an agglomerating agent for the hollow particles, and the polycarboxylic acid are added to the rubber, followed by mixing and stirring to provide a liquid silicone rubber mixture for forming the elastic layer. In the present disclosure, the liquid silicone rubber mixture according to the present disclosure described above is preferably used as the liquid silicone rubber mixture.

Figure 3:
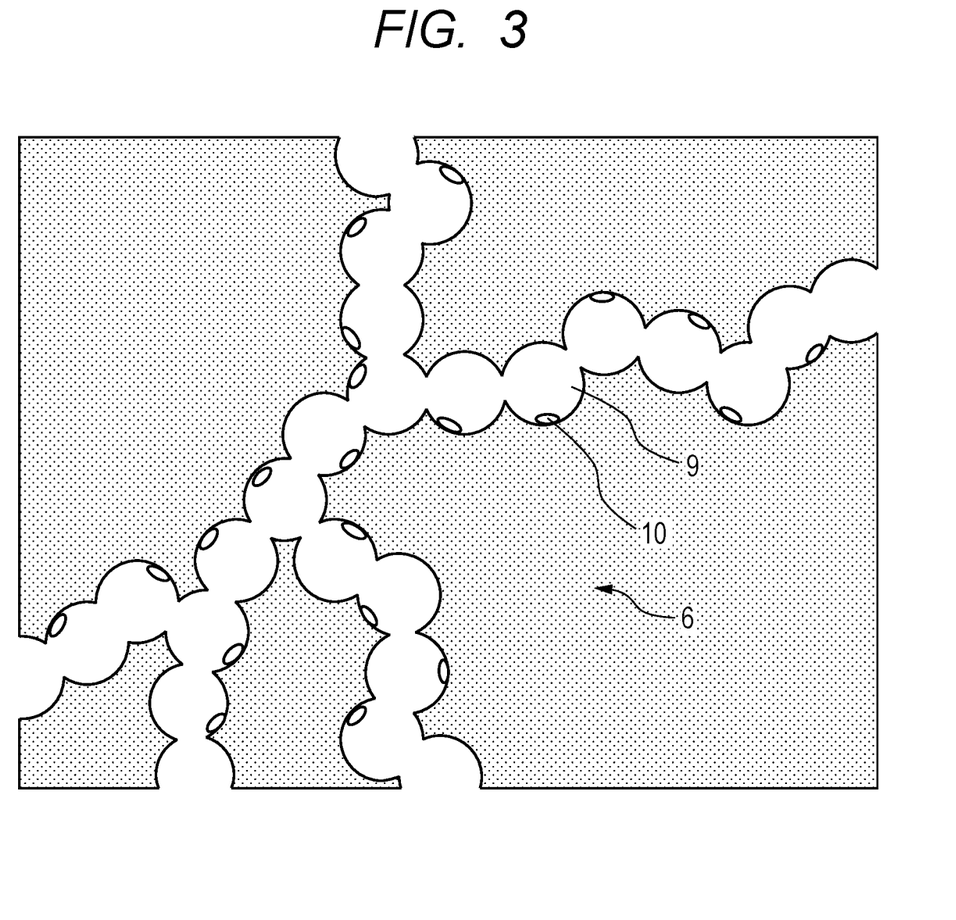
FIG. 3 is a schematic model view for illustrating the state of presence of the residues of the hollow particles in the base rubber material forming the elastic layer of the electrophotographic member according to the present disclosure.

After the liquid silicone rubber mixture has been arranged on the outer circumference of the substrate, the liquid silicone rubber mixture is subjected to a crosslinking reaction at a first crosslinking temperature to provide a silicone rubber molded product in a state in which resin microballoons 7 are agglomerated and dispersed in a so-called row connection manner in a base rubber material 6 through intermediation of an agglomerating agent 8 as illustrated in FIG. 2. When the silicone rubber molded product is heated at a temperature equal to or more than the decomposition temperature of each of the resin microballoons 7, the shells of the resin microballoons 7 undergo foam breakage, and are peeled from the wall surface of the silicone rubber by the action of the polycarboxylic acid to shrink. As a result, such an elastic layer having a communication hole 9 obtained by coupling a plurality of holes derived from the resin microballoons 7 to each other as illustrated in FIG. 3 can be obtained. In FIG. 3, residues 10 of the shells formed by the foam breakage of the resin microballoons 7 are represented by reference numeral 10, and the residues (thermoplastic resins) 10 are present in states of being peeled off from the wall surface of the communication hole 9 formed after the foam breakage.

The sizes of the holes depend on the sizes of the hollow particles to be used, and preferably have an average diameter of 10 μm or more and 200 μm or less. The resin microballoons 7 each having an outer diameter of about 10 μm or more and about 200 μm or less only need to be used as the hollow particles for adjusting the sizes of the holes. A method of measuring the size of the average diameter of the holes is as described below.

First, the elastic layer 5b is cut in an arbitrary direction with a razor for trimming (429 SUS UNCOT (product name), manufactured by Japan Electron Datum). Next, an arbitrary portion in a section of the elastic layer 5b cut as described above is observed with a scanning electron microscope (JSM-6300 (product name), manufactured by JEOL Ltd.), and is photographed at an acceleration voltage of 15 kV and a magnification of 100.

Holes in the section are observed as if the silicone rubber were deficient in a substantially perfect circular manner, and hence the circle-equivalent diameters of the deficient portions are measured. About 50 to about 100 holes are observed per field of view, though the number varies depending on the blending amount of the resin microballoons 7. Accordingly, 1,000 void points observed in a substantially perfect circular manner are observed, and the arithmetic average value of the measured values is defined as the average diameter of the holes.

[Surface Layer]

A material for the surface layer is, for example, a fluorine rubber or a fluorine resin from the viewpoint of a toner releasing property. Of those, a fluorine resin is preferred. For example, any one of the following resins is used as the fluorine resin:

a tetrafluoroethylene-perfluoro(alkyl vinyl ether) copolymer (PFA), a polytetrafluoroethylene (PTFE), a tetrafluoroethylene-hexafluoropropylene copolymer (FEP), and the like. Of those materials, a PFA is preferred from the viewpoints of moldability and a toner releasing property.

In addition, a filler may be incorporated into the surface layer for the purpose of controlling the thermal properties and electrical conductivity of the layer to the extent that the moldability and the toner releasing property are not impaired. Examples of the filler include carbon black, iron oxide, silica, and titanium oxide.

The thickness of the surface layer is preferably 10 μm or more and 100 μm or less. When the thickness is 10 μm or more, the surface layer can have strength enough to resist the thermal expansion of each of the substrate and the elastic layer, and hence there is no risk in that the surface layer is broken. In addition, when the thickness is 100 μm or less, an excessive increase in hardness of the pressurizing roller is prevented, and hence a sufficient nip width can be formed.

[Production of Electrophotographic Member]

A basic molding and production method for the electrophotographic member, in particular, the roller for electrophotography has been widely known, and a known method may be adopted as long as the method is not contrary to the requirements of the present disclosure.

The elastic layer may be formed by a processing method, such as a mold molding method, a blade coating method, a nozzle coating method, or a ring coating method, which is described in each of Japanese Patent Application Laid-Open No. 2001-62380 and Japanese Patent Application Laid-Open No. 2002-213432.

The elastic layer may be formed by heating and crosslinking an admixture carried on a cored bar (substrate) according to any such method. Of those methods, a mold molding method is preferred because the method is hardly affected by a dimensional change at the time of the molding of the elastic layer and enables the integral molding of the surface layer. A split mold or a tubular mold may be utilized as a mold, but the tubular mold that causes no particle line at the time of the molding is suitable.

When the tubular mold is used, the cored bar subjected to an adhesion treatment or the like in advance is inserted into the tubular mold, and dies for holding the cored bar, the dies having an injection port and an outflow port, are set in both end portions of the mold. When the surface layer is integrally molded, a fluorine resin tube that is separately molded and that has an inner surface subjected to an adhesion treatment may be stretched on the inner surface of the tubular mold prior to the setting of the dies. After that, the liquid silicone rubber mixture for forming the elastic layer obtained by kneading the resin microballoons, the wholly etherified compound of a polyhydric alcohol, the polycarboxylic acid, and the like in advance is pressed in from an injection port side. At this time, when the mold is of a closed structure, the resin microballoons are compressed by a casting pressure to deform in some cases, and hence casting is preferably performed under a state in which the outflow port is opened. After the outflow of the liquid silicone rubber mixture for forming the elastic layer from the outflow port has been observed, the injection port and the outflow port are closed under a state in which substantially no residual pressure occurs, and the mold is heated to the first crosslinking temperature of the liquid silicone rubber mixture with a heating platen, an electric furnace, or the like.

After the completion of the first crosslinking of the liquid silicone rubber mixture, the dies set in both ends of the tubular mold are removed, and a roller of which a cured silicone rubber layer is integrated with the outer circumference of the cored bar and the fluorine resin tube (surface layer) is further integrated with the outer circumference thereof is removed from the mold. When the removed roller is heated at the secondary crosslinking temperature of the cured silicone rubber, the resin microballoons undergo foam breakage by the heating to shrink. As a result, portions where the resin microballoons have been present serve as holes, and portions connected in a row communicate to each other to enable the formation of a communication hole obtained by coupling the plurality of holes to each other.

When the surface layer is not molded integrally with the elastic layer, the surface layer may be formed on the outer circumference of the elastic layer through intermediation of an adhesive or the like after the secondary crosslinking.

Further, in each of both end portions of the roller in its longitudinal direction, the elastic layer and the surface layer are removed to expose the cored bar. At this time, when a side surface of the elastic layer is cut and exposed, the communication hole communicates to up to the outside.

That is, a process of producing an electrophotographic member according to one embodiment of the present disclosure is a process of producing an electrophotographic member including a substrate and an elastic layer on the substrate, the elastic layer having a communication hole that is obtained by coupling a plurality of holes to each other and that communicates to an outside, the process including steps of:

(a) forming a layer of a liquid silicone rubber mixture containing following components (1) to (6) on the substrate:
 (1) an organopolysiloxane having two or more unsaturated aliphatic groups in a molecule thereof;
 (2) an organohydrogenpolysiloxane having two or more hydrogen atoms bonded to a silicon atom in a molecule thereof;
 (3) a hydrosilylation catalyst;
 (4) hollow particles each having a layer containing a thermoplastic resin as a shell;
 (5) a compound having at least one selected from the group consisting of a hydroxyl group and an ether bond in a molecule thereof, and having a sum of a number of the hydroxyl group and a number of the ether bond of two or more; and
 (6) a polycarboxylic acid;
(b) first crosslinking the liquid silicone rubber mixture in the layer of the liquid silicone rubber mixture to form a layer containing a cured silicone rubber and an agglomerate of the hollow particles dispersed in the cured silicone rubber;
(c) secondary crosslinking the cured silicone rubber; and
(d) causing the hollow particles in the layer containing the cured silicone rubber to undergo foam breakage to couple a plurality of holes derived from the hollow particles to each other to form the communication hole, and peeling the shells of the hollow particles from a wall surface of the cured silicone rubber, to form the elastic layer.

In the step (b), the liquid silicone rubber mixture is subjected to a crosslinking reaction at a first crosslinking temperature to provide a rubber molded product in a state in which the hollow particles (resin microballoons) 7 are agglomerated and dispersed in a so-called row connection manner in the base rubber material 6 through intermediation of the agglomerating agent 8 as illustrated in FIG. 2. In the step (d), the shells of the resin microballoons 7 undergo foam breakage, and are peeled from the wall surface of the silicone rubber by the action of the polycarboxylic acid to shrink. As a result, such an elastic layer having the communication hole 9 that is obtained by coupling the holes derived from the resin microballoons to each other and that communicates to the outside as illustrated in FIG. 3 can be obtained.

In the first crosslinking in the step (b), a first crosslinking temperature suitable for the liquid silicone rubber mixture to be used is selected, and is preferably 100° C. or more. In addition, the first crosslinking temperature is the temperature at which the hollow particles (resin microballoons) 7 do not undergo foam breakage, and is preferably 150° C. or less. A heating time is preferably from 5 minutes to 30 minutes. In addition, a secondary crosslinking temperature in the step (c) is preferably equal to or more than the decomposition temperature of the thermoplastic resin forming each of the shells of the hollow particles (resin microballoons) 7, and is more preferably 200° C. or more. The foam breakage of the hollow particles 7 and the formation of the communication hole in the step (d) occur simultaneously with the secondary crosslinking in the step (c). A heating treatment for causing the foam breakage of the hollow particles 7 in the step (d) may be performed separately from the step (c). Although an upper limit for a heating temperature is not particularly limited as long as the elastic layer is not affected, the upper limit is preferably 250° C. or less. A heating time including the secondary crosslinking of the silicone rubber and the foam breakage of the hollow particles is preferably from 30 minutes to 4 hours.

[Fixing Device]

A fixing device according to one embodiment of the present disclosure is a fixing device including the electrophotographic member according to one embodiment of the present disclosure described in the foregoing as a pressurizing member.

FIG. 1 is a schematic construction model view of an example of the fixing device. The fixing device of this example is a so-called tensionless type fixing device of a film heating system or a pressurizing rotating body (pressurizing roller) driving system described in each of, for example, Japanese Patent Application Laid-Open Nos. H04-44075 to H04-44083, and Japanese Patent Application Laid-Open Nos. H04-204980 to H04-204984.

A fixing device 1 of FIG. 1 includes a film guide member (stay) 2, a heating body (heater) 3, and a heat-resistant film (flexible film) 4. The film guide member 2 is an oblong member whose transverse section is of a substantially half arc shape and a gutter type, the member adopting a direction vertical to the drawing as its longitudinal direction. The heating body 3 is an oblong member stored and held in a groove formed in a substantially central portion of the lower surface of the film guide member 2 along the longitudinal direction. The heat-resistant film 4 is an endless belt-shaped (cylindrical) member loosely externally fitted to the film guide member with the heating body. In addition, the fixing device includes the pressurizing roller 5 serving as a pressurizing member brought into pressure contact with the lower surface of the heating body 3 through intermediation of the heat-resistant film 4. As described in the foregoing, the electrophotographic member according to the present disclosure is used as the pressurizing roller.

A pressure-contact nip portion (fixing nip portion) N is formed between the pressurizing roller 5 and the heating body 3 by the elastic deformation of the elastic layer 5b of the pressurizing roller 5 brought into pressure contact with the heating body 3 through intermediation of the heat-resistant film 4. The driving force of a driving source M is transmitted to the pressurizing roller 5 through a power transmission mechanism (not shown), such as a gear, to rotationally drive the roller at a predetermined circumferential speed in a counterclockwise direction indicated by the arrow b.

The film guide member 2 is, for example, a molded article of a heat-resistant resin, such as a polyphenylene sulfide (PPS) or a liquid crystal polymer.

The heating body 3 is preferably a ceramic heater wholly having a low heat capacity, the heater being formed of, for example, a substrate 3a, energization heat generators (resistance heat generators) 3b formed and included on the surface side (film sliding surface side) of the substrate along the longitudinal direction, a surface protective layer 3c, and a temperature detecting element 3d. An oblong and thin plate-shaped substrate made of alumina, AlN, or the like may be used as the substrate. The energization heat generators each include, for example, a linear or narrow band-shaped Ag/Pd alloy. The surface protective layer is a thin layer, such as a glass layer. The temperature detecting element is formed of, for example, a thermistor arranged on the back surface side of the substrate 3a. The ceramic heater is controlled to maintain a predetermined fixation temperature (controlled temperature) by an electric power control system including the temperature detecting element 3d after its temperature has been rapidly increased by electric power supply to the energization heat generators 3b.

The heat-resistant film is a composite layer film whose total thickness has been set to 400 μm or less, preferably 50 μm or more and 300 μm or less for reducing its heat capacity to improve the quick start property of the device. The heat-resistant film may have, for example, a two-layer structure formed of a base layer and a surface layer (releasing layer), or a three-layer structure formed of the base layer, an elastic layer, and the surface layer (releasing layer). Layers each formed of a heat-resistant resin, such as a polyimide, a polyamide imide, or a PEEK, or a metal member having heat resistance and high heat conductivity, such as SUS, Al, Ni, Ti, or Zn, are formed alone or in combination thereof as the base layer. The elastic layer for improving toner fixing performance may be formed on the base layer, and a silicone rubber, a fluorine rubber, or the like having added thereto a heat-conductive filler, a reinforcing material, or the like is suitably used as a material for the elastic layer.

The main polymer of the surface layer (releasing layer) of the heat-resistant film includes a fluorine resin, and specific examples thereof include the following resins: a tetrafluoroethylene-perfluoro(alkyl vinyl ether) copolymer (PFA), a polytetrafluoroethylene (PTFE), and a tetrafluoroethylene-hexafluoropropylene copolymer (FEP). Of those, a PFA is preferred in terms of, for example, moldability, heat resistance, and bending resistance. Those materials may be used alone or in combination thereof. An electroconductive material, such as carbon black or an ion conductive substance, may be incorporated into the releasing layer as required.

When the pressurizing roller 5 is rotationally driven in the counterclockwise direction indicated by the arrow b at least at the time of the performance of image formation, the heat-resistant film 4 follows the rotation of the pressurizing roller 5. In other words, when the pressurizing roller 5 is driven, in the fixing nip portion N, a rotational force acts on the heat-resistant film 4 by a frictional force between the pressurizing roller 5 and the outer surface of the heat-resistant film 4. During the rotation of the heat-resistant film 4, the inner surface of the heat-resistant film slides while being in close contact with the lower surface (surface protective layer 3c) serving as the surface of the heating body 3 in the fixing nip portion N. In this case, in order that a sliding resistance between the inner surface of the heat-resistant film 4 and the surface protective layer 3c serving as the lower surface of the heating body 3 on which the inner surface slides may be reduced, a lubricant excellent in heat resistance is desirably interposed between both the surfaces.

When a recording material P is sandwiched and conveyed in the fixing nip portion N, a toner image on the recording material P is heated and fixed. Then, the recording material P that has passed the fixing nip portion N is separated from the outer surface of the heat-resistant film 4 to be conveyed.

The fixing device of a film heating system like this embodiment can use a heating body having a small heat capacity and hence showing a rapid temperature increase, and hence can significantly shorten a time period required for the heating body to reach a predetermined temperature. The temperature of the heating body can be increased even from normal temperature to high temperature within a short time period. Accordingly, there is no need to perform stand-by temperature control when the device is in a stand-by state at the time of non-printing, and hence power savings can be achieved.

In addition, substantially no tension acts on the rotating heat-resistant film 4 except the fixing nip portion N, and hence only a flange member simply for receiving the end portion of the heat-resistant film 4 is arranged as the film guide member 2.

According to one embodiment of the present disclosure, there can be obtained a liquid silicone rubber mixture providing an electrophotographic member that includes an elastic layer having a communication hole communicating to the outside and that shows a small change in hardness even after a long-term use.

According to another embodiment of the present disclosure, there can be obtained an electrophotographic member that includes an elastic layer having a communication hole communicating to the outside and that shows a small change in hardness even after a long-term use, and a process of producing the member.

The present disclosure is described more specifically below by way of Examples. The contents of the present disclosure are not limited to Examples below.

Materials shown in Table 1 were prepared as the component (4), the component (5), and the component (6) to be used in Examples.

TABLE 1

| | No. | Material |
|---|---|---|
| Component (4) Hollow particles | 1 | Acrylonitrile resin microballoons (product name: MATSUMOTO MICROSPHERE FN-100MD; manufactured by Matsumoto Yushi-Seiyaku Co., Ltd.) |
| | 2 | Acrylonitrile resin microballoons (product name: MATSUMOTO MICROSPHERE F-80DE; manufactured by Matsumoto Yushi-Seiyaku Co., Ltd.) |
| | 3 | Acrylonitrile resin microballoons (product name: Expancel 920DE80d30, manufactured by Japan Fillite Co., Ltd.) |

TABLE 1-continued

| | No. | Material |
|---|---|---|
| Component (5) Agglomerating agent | 1 | Tetraethylene glycol dimethyl ether (MTEM) (product name: HISOLVE MTEM, manufactured by TOHO Chemical Industry Co., Ltd., boiling point: 275° C.) |
| | 2 | Triethylene glycol dimethyl ether (MTM) (product name: HISOLVE MTM, manufactured by TOHO Chemical Industry Co., Ltd., boiling point: 216° C.) |
| | 3 | Diethylene glycol dimethyl ether (MDM) (product name: HISOLVE MDM, manufactured by TOHO Chemical Industry Co., Ltd., boiling point: 162° C.) |
| | 4 | Triethylene glycol butyl methyl ether (BTM) (product name: HISOLVE BTM, manufactured by TOHO Chemical Industry Co., Ltd., boiling point: 261° C.) |
| | 5 | Tetraethylene glycol (TEEG) (manufactured by Wako Pure Chemical Industries, Ltd., boiling point: 314° C.) |
| | 6 | Triethylene glycol monomethyl ether (TM) (product name: HIMOL TM, manufactured by TOHO Chemical Industry Co., Ltd., boiling point: 249° C.) |
| Component (6) Polycarboxylic acid | 1 | Citric acid, manufactured by Wako Pure Chemical Industries, Ltd. |
| | 2 | DL-Malic acid, manufactured by Wako Pure Chemical Industries, Ltd. |
| | 3 | DL-Tartaric acid, manufactured by Wako Pure Chemical Industries, Ltd. |
| | 4 | Succinic acid, manufactured by Wako Pure Chemical Industries, Ltd. |
| | 5 | o-Phthalic acid, manufactured by Wako Pure Chemical Industries, Ltd. |

Silicone rubber undiluted solutions a and b were each prepared by sufficiently mixing materials whose kinds and amounts were shown in Table 2 below.

TABLE 2

| | | Silicone rubber undiluted solution (part(s) by mass) | |
|---|---|---|---|
| | Material | a | b |
| Component (1) | Dimethyl silicone oil having vinyl groups at both of its terminals and having a kinematic viscosity of 1,000 mm$^2$/s (product name: DMS-V31, manufactured by Gelest, Inc.) | 33 | 33 |
| | Dimethyl silicone oil having vinyl groups at both of its terminals and having a kinematic viscosity of 100 mm$^2$/s (product name: DMS-V21, manufactured by Gelest, Inc.) | 67 | 67 |
| Component (2) | Organohydrogenpolysiloxane (product name: HMS-301, manufactured by Gelest, Inc.) | 20 | 14 |
| Component (3) | Platinum catalyst solution (product name: SIP6830.3, manufactured by Gelest, Inc.) | 0.2 | 0.2 |
| Curing retarder | 2-Methyl-3-butyn-2-ol | 0.1 | 0.1 |

Example 1

1. Preparation of Liquid Silicone Rubber Mixture

The silicone rubber undiluted solution a was blended with materials whose kinds and amounts (amounts with respect to 100 parts by mass of a liquid silicone rubber mixture) were shown in Table 3 below. Thus, a liquid silicone rubber mixture a-1 according to the present disclosure was obtained. A rotation-revolution type mixer (product name: ARV-3000MA, manufactured by Thinky Corporation) was used in the blending, and the undiluted solution and the materials were mixed and stirred at a revolution speed of 600 rpm and a rotation speed of 450 rpm for 2 minutes. The hollow particles corresponding to the component (4) were used after having been expanded through heating in an electric furnace at 150° C. for 20 minutes in advance.

2. Production of Electrophotographic Member

A fluorine resin (PFA) tube having an outer diameter of 20 mm and a thickness of 30 μm (manufactured by Kurabo Industries Ltd., product name: KURANFLON-LT), a stainless-steel cylindrical mold having an inner diameter of 20 mm and a length of 230 mm, and an aluminum solid bar (substrate) having an inner diameter of 13 mm and a length of 270 mm were prepared. A primer (manufactured by Dow Corning Toray Co., Ltd., product name: DY 39-067) was applied as a primer for adhesion to the inner surface of the tube. In addition, a primer (manufactured by Dow Corning Toray Co., Ltd., product name: DY 39-051) was applied as a primer for adhesion to the surface of the substrate.

Next, the tube was stretched on the inner surface of the cylindrical mold, and the substrate was arranged in a central portion in the cylindrical mold, followed by the setting of dies each having an injection port or an outflow port in both ends of the cylindrical mold. Thus, a cylindrical mold for casting was assembled.

The cylindrical mold was fixed so that the injection port was directed downward. The liquid silicone rubber mixture a-1 was pressed in from the injection port, and the infection port positioned below the cylindrical mold was closed at the timing when the rubber composition was discharged from the outflow port. The mold was left to stand for a while until a residual pressure was released, and then the outflow port was also closed. In this state, the cylindrical mold was set in a heating platen whose temperature had been controlled to 120° C., and was heated for 30 minutes to perform the first crosslinking of the liquid silicone rubber mixture. Next, the cylindrical mold was cooled to room temperature, and the dies in both ends were removed, followed by the removal of a roller in which a rubber layer and the tube were laminated on the substrate from the cylindrical mold.

Next, the roller was heated in an electric furnace whose temperature had been controlled to 230° C. for 4 hours to perform the secondary crosslinking of the silicone rubber. At the same time, the hollow particles were decomposed and caused to undergo foam breakage to produce a communication hole obtained by coupling holes derived from the hollow particles to each other. Thus, a member A-1 for electrophotography according to the present disclosure was obtained.

Examples 2 to 10

Liquid silicone rubber mixtures a-2 to a-10 were each obtained in the same manner as in Example 1 except that: the silicone rubber undiluted solution a was used; and the formulation of the component (4), the component (5), and the component (6) was set as shown in Table 3. In addition, members A-2 to A-10 for electrophotography were obtained by molding the mixtures into the members for electrophotography under the same conditions as those of Example 1.

Examples 11 and 12

Liquid silicone rubber mixtures b-1 and b-2 were each obtained in the same manner as the liquid silicone rubber mixture 1 according to Example 1 except that: the silicone rubber undiluted solution b was used; and the formulation of the component (4), the component (5), and the component (6) was set as shown in Table 3. In addition, members B-1 and B-2 for electrophotography were each obtained in the same manner as the member A-1 for electrophotography according to Example 1.

Comparative Example 1

A liquid silicone rubber mixture a-11 was obtained under the same conditions as those of Example 1 except that citric acid serving as the component (6) was removed from the formulation of Example 1. In addition, a member A-11 for electrophotography was obtained by molding the mixture into the electrophotographic member under the same conditions as those of Example 1.

Comparative Examples 2 and 3

Liquid silicone rubber mixtures a-12 and a-13 were each obtained in the same manner as in Example 1 except that the formulation of the components (5) and (6) was changed as shown in Table 3. In addition, members A-12 and A-13 for electrophotography were obtained by molding the mixtures into the members for electrophotography under the same conditions as those of Example 1.

Comparative Example 4

A liquid silicone rubber mixture a-14 was obtained in the same manner as in Example 1 except that the components (5) and (6) were not used. In addition, a member A-14 for electrophotography was obtained by molding the mixture into the electrophotographic member under the same conditions as those of Example 1.

TABLE 3

| | | Silicone rubber undiluted solution | Component (4) No. | Component (4) Part(s) by mass | Component (5) No. | Component (5) Part(s) by mass | Component (6) No. | Component (6) Part(s) by mass | Liquid silicone rubber mixture No. | Vol % of component (4) | Member No. for electro photography |
|---|---|---|---|---|---|---|---|---|---|---|---|
| Example | 1 | a | 1 | 2.5 | 1 | 5.0 | 1 | 2.0 | a-1 | 47 | A-1 |
| | 2 | a | 1 | 2.5 | 1 | 3.1 | 2 | 1.9 | a-2 | 47 | A-2 |
| | 3 | a | 1 | 2.5 | 1 | 5.0 | 3 | 2.0 | a-3 | 47 | A-3 |
| | 4 | a | 1 | 2.5 | 1 | 5.0 | 4 | 2.0 | a-4 | 47 | A-4 |
| | 5 | a | 1 | 2.5 | 1 | 5.0 | 5 | 2.0 | a-5 | 47 | A-5 |
| | 6 | a | 1 | 2.5 | 2 | 7.1 | 1 | 2.9 | a-6 | 47 | A-6 |
| | 7 | a | 1 | 2.5 | 3 | 7.1 | 1 | 2.9 | a-7 | 47 | A-7 |
| | 8 | a | 1 | 2.5 | 4 | 7.1 | 1 | 2.9 | a-8 | 47 | A-8 |

TABLE 3-continued

|  |  | Silicone rubber undiluted solution | Component (4) No. | Component (4) Part(s) by mass | Component (5) No. | Component (5) Part(s) by mass | Component (6) No. | Component (6) Part(s) by mass | Liquid silicone rubber mixture No. | Vol % of component (4) | Member No. for electro photography |
|---|---|---|---|---|---|---|---|---|---|---|---|
|  | 9 | a | 1 | 2.5 | 5 | 5.0 | 1 | 1.0 | a-9 | 47 | A-9 |
|  | 10 | a | 1 | 2.5 | 6 | 5.0 | 1 | 1.0 | a-10 | 47 | A-10 |
|  | 11 | b | 2 | 2.5 | 1 | 7.1 | 1 | 2.9 | b-1 | 48 | B-1 |
|  | 12 | b | 3 | 2.5 | 1 | 7.1 | 1 | 2.9 | b-2 | 46 | B-2 |
| Comparative | 1 | a | 1 | 2.5 | 1 | 5.0 | — | — | a-11 | 47 | A-11 |
| Example | 2 | a | 1 | 2.5 | 5 | 5.0 | — | — | a-12 | 47 | A-12 |
|  | 3 | a | 1 | 2.5 | — | — | 1 | 10.0 | a-13 | 47 | A-13 |
|  | 4 | a | 1 | 2.5 | — | — | — | — | a-14 | 47 | A-14 |

[Performance Evaluations of Electrophotographic Member]

The members for electrophotography obtained in Examples and Comparative Examples were each subjected to the following evaluations. The results of the evaluations are shown in Table 4.

[Evaluation 1] Degree of Communication of Elastic Layer

The elastic layer of an electrophotographic member is divided into five equal sections in its longitudinal direction, and about 10 g of a sample is cut out of each region. The mass of each sample is precisely weighed and represented by $W_1$. Next, the five samples thus cut out are loaded into a beaker containing water and forcibly sunk in the water. The samples are loaded into a decompression vessel together with the beaker, and a pressure reduction is started. Under a state in which a pressure in the vessel is reduced to 10 hPa, deaeration is performed until no air bubbles appear from the inside of the water. Then, the pressure is returned to normal pressure. The samples whose holes have absorbed the water are removed from the water, and the mass of each of the samples is precisely weighed and represented by $W_2$. The water absorption ratio (%) of each sample is calculated from a calculation expression (1). The average of the five samples is defined as the water absorption ratio (%) of the elastic layer, and is used as an indicator of its degree of communication.

$$100 \times (W_2 - W_1)/W_1 \quad \text{Calculation expression (1)}$$

[Evaluation 2] Change in Outer Diameter of Electrophotographic Member

An electrophotographic member is mounted as the pressurizing roller of the fixing device of a laser printer (product name: LBP252; manufactured by Canon Inc., A4, 33 sheets/min). An image extension-controlling function by the driving motor of the image forming apparatus is stopped, and preparation is performed so that image extension in association with a change in outer diameter of the pressurizing roller can be evaluated.

Environment: A temperature of 23° C. and a relative humidity of 60%

Paper kind: "CS-680" (product name; Canon Marketing Japan Inc.; basis weight: 68 g/m², paper size: A4)

Image pattern: Horizontal lines (10-millimeter pitch)

Number of sheets to be passed:

100 Sheets are continuously passed.

Start of paper passing:

Cold start (cold state)

Figure 4:
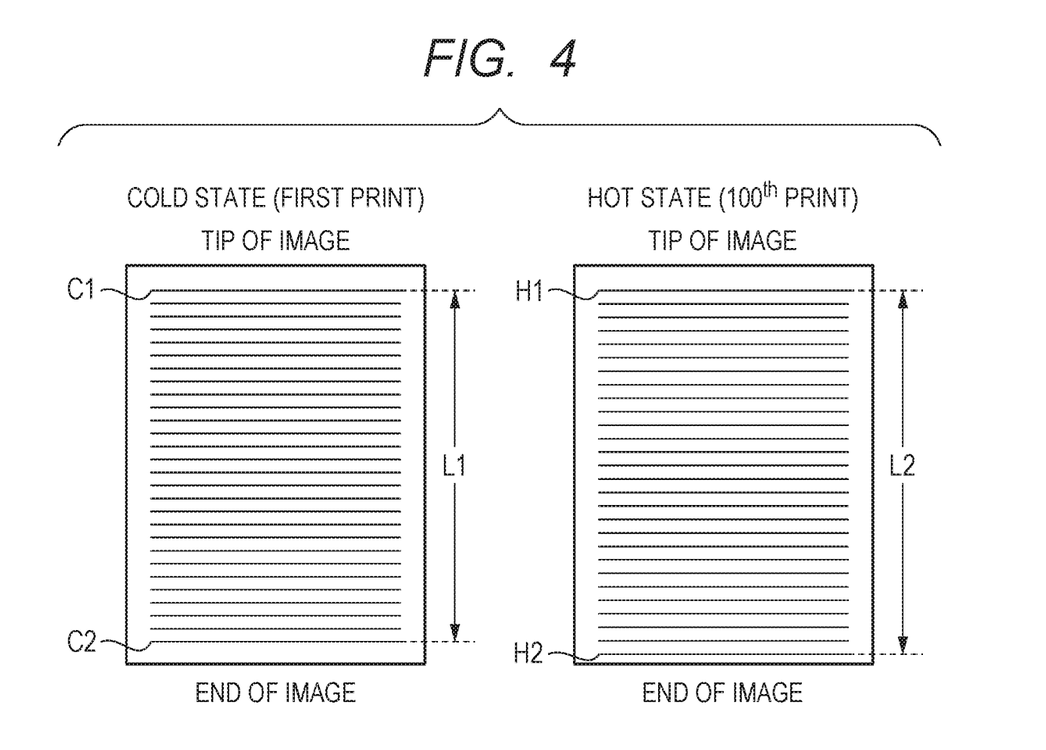
FIG. 4 is an explanatory view of the evaluation of a change in outer diameter of the electrophotographic member.

When the pressurizing roller is heated from the start of printing to thermally expand, the paper serving as a recording material is pulled by the fixing device, and hence an influence of the image extension, that is, the change in outer diameter of the pressurizing roller can be evaluated by measuring the conveyance direction length of the image pattern. That is, horizontal lines are printed in the A4 paper as illustrated in FIG. 4, and a distance L1 from an image position C1 to an image position C2 in a first print (cold state) and a distance L2 from an image position H1 to an image position H2 in a 100-th print (hot state) are measured. An image extension ratio is calculated from a calculation expression (2), and is used as an indicator of the change in outer diameter.

$$100 \times (L2 - L1)/L1 \quad \text{Calculation expression (2)}$$

[Evaluation 3] Change in Hardness of Electrophotographic Member

An electrophotographic member is mounted as the pressurizing roller of the fixing device in the laser printer.

Environment: A temperature of 23° C. and a relative humidity of 60%

Paper kind: "CS-680" (product name; Canon Marketing Japan Inc.; basis weight: 68 g/m², paper size: A4)

Image pattern: Horizontal lines (10-millimeter pitch)

Number of sheets to be passed:

100,000 Sheets are continuously passed.

An initial hardness $HS_1$ of the pressurizing roller and a hardness $HS_2$ thereof after 100,000 sheets of the paper have been continuously passed under the above-mentioned conditions are measured, and a value for "$HS_1 - HS_2$" is defined as a value for a change in hardness in an endurance test. A numerical value within 1 second after the pressurizing roller has been brought into close contact with an Asker C type hardness meter (manufactured by Kobunshi Keiki Co., Ltd.) under a room temperature environment at 25° C. at a load of 600 gf is read, and the value is adopted as a hardness.

TABLE 4

| Electrophotographic Member | Degree of communication (water absorption ratio) (%) | Change in outer diameter (image extension) (%) | Change in hardness at time of endurance (°) |
|---|---|---|---|
| Example 1 | A-1 | 80 | 1.6 | 1.8 |
| Example 2 | A-2 | 86 | 1.5 | 1.5 |
| Example 3 | A-3 | 83 | 1.5 | 1.5 |
| Example 4 | A-4 | 79 | 1.6 | 1.8 |
| Example 5 | A-5 | 101 | 1.3 | 0.8 |
| Example 6 | A-6 | 90 | 1.5 | 1.3 |
| Example 7 | A-7 | 85 | 1.5 | 1.5 |
| Example 8 | A-8 | 72 | 1.7 | 2.0 |
| Example 9 | A-9 | 94 | 1.4 | 1.1 |
| Example 10 | A-10 | 91 | 1.5 | 1.2 |
| Example 11 | B-1 | 98 | 1.3 | 1.0 |
| Example 12 | B-2 | 89 | 1.4 | 1.3 |

TABLE 4-continued

|  | Electrophotographic Member | Degree of communication (water absorption ratio) (%) | Change in outer diameter (image extension) (%) | Change in hardness at time of endurance (°) |
|---|---|---|---|---|
| Comparative Example 1 | A-11 | 7 | 2.7 | 4.9 |
| Comparative Example 2 | A-12 | 27 | 2.5 | 4.0 |
| Comparative Example 3 | A-13 | 4 | 2.8 | 5.1 |
| Comparative Example 4 | A-14 | 5 | 2.8 | 5.0 |

When the change in outer diameter is more than 2%, an image may protrude from the paper.

It is found that each of the elastic layers of the members for electrophotography of Comparative Examples 1 to 4 has a degree of communication (water absorption ratio) as low as less than 30%, and each of the members shows a large change in outer diameter. Meanwhile, it is found that each of the elastic layers of the members for electrophotography of Examples 1 to 12 has a degree of communication (water absorption ratio) as high as more than 70%, and each of the members shows a change in outer diameter of less than 2%, which is a satisfactory result.

In addition, with regard to the change in hardness after the 100,000-sheet endurance test, the hardness of each of the members for electrophotography of Comparative Examples 1 to 4 reduces by at least 4°, but a reduction in hardness of each of the members for electrophotography of Examples 1 to 12 is 2° or less, which is a satisfactory result. It is assumed that in each of Comparative Examples 1 to 4, some shells of the resin microballoons are not peeled from the wall surface of the silicone rubber, and the peeling gradually advances at a subsequent use stage of the member to largely reduce the hardness as compared to that at the initial stage of the use thereof.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-089263, filed Apr. 28, 2017, which is hereby incorporated by reference herein in its entirety.

What is claimed is:

1. A pressurizing member of a fixing device for use in an electrophotographic apparatus, comprising:
   a substrate; and
   an elastic layer containing a silicone rubber on the substrate,
   wherein the elastic layer has a communication hole, which is obtained by coupling holes to each other and which communicates to an outside, and further contains a polycarboxylic acid, the holes resulting from hollow particles each having a shell containing a thermoplastic resin.

2. The pressurizing member according to claim 1, further comprising, on the elastic layer, a layer containing a fluorine resin as an outermost layer.

3. The pressurizing member according to claim 1, wherein the electrophotographic member has a roller shape.

4. The pressurizing member according to claim 1, wherein the polycarboxylic acid is at least one selected from the group consisting of citric acid, succinic acid, malic acid, tartaric acid, and o-phthalic acid.

5. The pressurizing member according to claim 1, wherein the elastic layer contains the thermoplastic resin in the communication hole.

* * * * *